Nov. 16, 1937.  J. M. MAJEWSKI, JR  2,099,170
FRUIT JUICE EXTRACTOR
Filed June 22, 1936
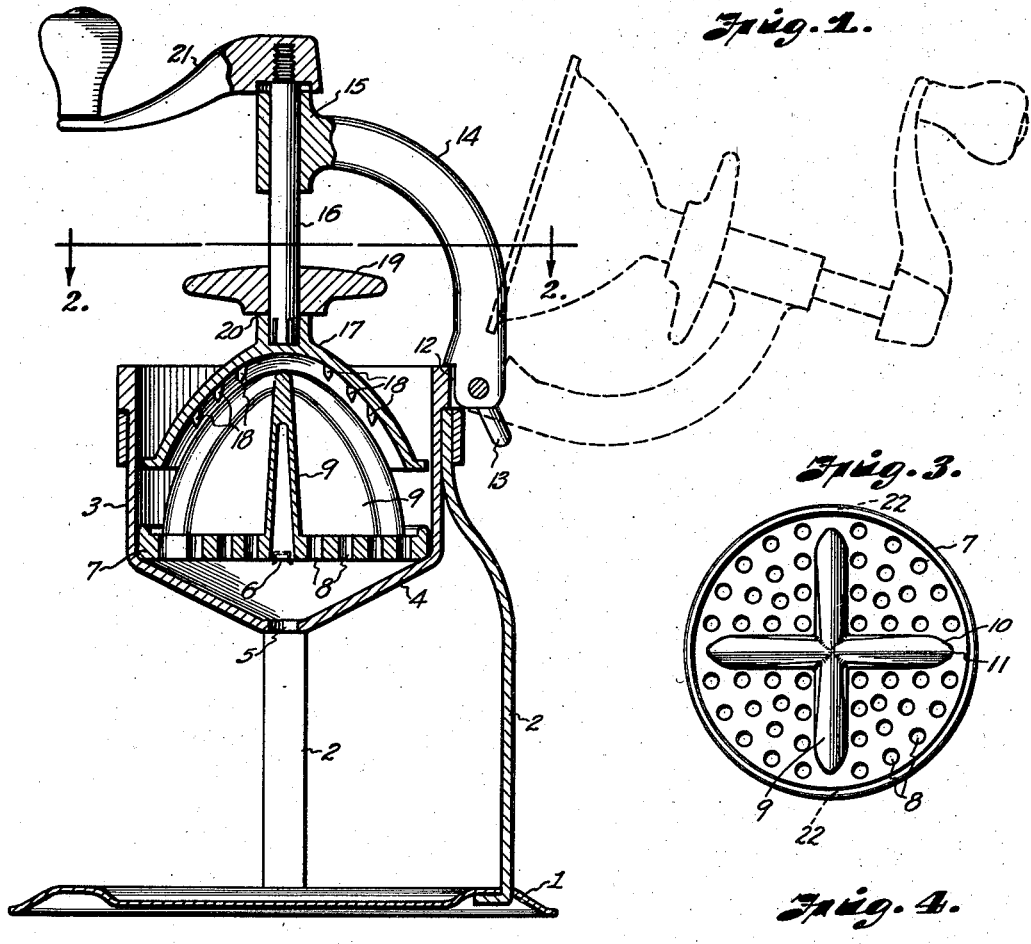
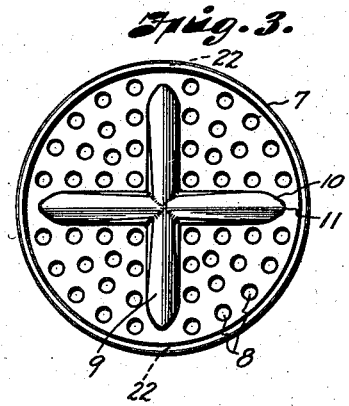
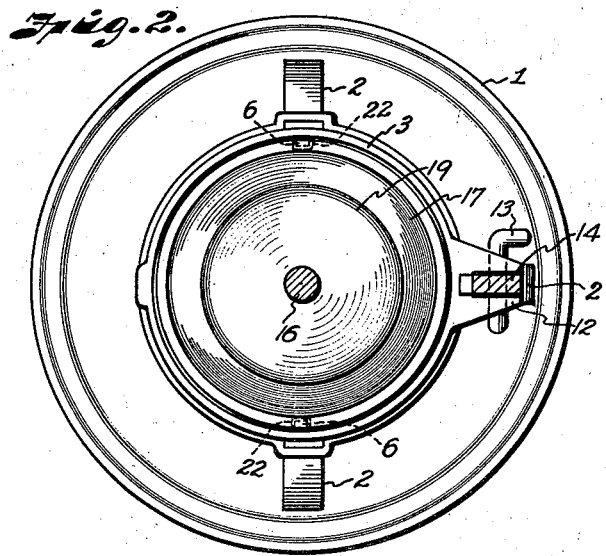
INVENTOR
Joseph M. Majewski Jr.
BY
ATTORNEY Patented Nov. 16, 1937

2,099,170

UNITED STATES PATENT OFFICE 2,099,170

FRUIT JUICE EXTRACTOR

Joseph M. Majewski, Jr., Kansas City, Mo., assignor to Foster L. Talge, Kansas City, Mo., doing business as Rival Manufacturing Company, Kansas City, Mo.

Application June 22, 1936, Serial No. 86,456

2 Claims. (Cl. 146—3)

My invention relates to fruit juice extractors and more particularly to a device for removing juice from oranges, lemons, grape fruit, and the like.

In the operation of extracting juice from citrus fruit, there are five factors to be considered, namely, the juice itself, the pulp, the fibre, the seeds, and the rind. In those juice extractors which perform the juicing operation by crushing or pressing the halves of oranges or the like, some of the oil contained in the rind is expressed and mingles with the juice. This imparts to the juice a slightly bitter taste which is not palatable to some people. Furthermore, it appears that the oil in the rind has a deleterious effect upon keeping qualities of the juice in a refrigerator. Then, too, the juice which is extracted in a juicer of the pressing type is expelled from the cells by pressure with the result that considerable pulp is often carried along with the juice. Frequently, unbroken juice cells surrounded by pulp are forced from the orange and find their way into the juice.

One object of my invention is to provide a juice extractor in which no oil in the rind is removed.

Another object of my invention is to provide a juice extractor in which the juice is reamed or squeezed from the orange in such a manner that the pulp will be retained upon the rind.

Another object of my invention is to provide a juice extractor in which the juice is strained on its way to the collecting vessel.

Another object of my invention is to provide a simple device which is easily cleaned and which will express juice from citrus fruit in a simple and convenient manner.

In the accompanying drawing which forms part of the instant specification and is to be read in conjunction therewith, and in which like reference numerals are used to indicate like parts in the various views, Figure 1 is a sectional elevation of a fruit juice extractor showing one form of my invention.

Figure 2 is a sectional view taken on a line 2—2 of Figure 1.

Figure 3 is a plan view of the reamer element of my invention.

Figure 4 is an interior plan view of a rotating cap member forming part of the construction shown in Figure 1.

In general, my invention contemplates the provision of a bowl provided with a juice draining outlet. The bowl is mounted upon any suitable standard so that a juice receiving receptacle may be positioned beneath the outlet. Positioned within the bowl is a reamer which may be made of glazed ceramic material. The reamer is provided with rounded edges in the form of fillets which will serve to wipe the pulp against the rind rather than cut or squeeze the pulp from the rind. The reamer is formed integral with a strainer plate. The combined reamer and strainer plate is removably mounted in the bowl. Pivotally mounted adjacent the bowl is an arm containing a bearing for a shaft, adapted to be rotated by a suitable handle and carrying an inverted bowl provided with impaling members. Pressure exerting means are provided so that the shaft which is mounted for movement along its axis may be pressed downward from over the reamer and simultaneously rotated.

More particularly referring now to the drawing, upon any suitable standard which may be formed of a base member 1, provided with legs 2, I support a bowl 3 provided with a funnel shaped bottom 4, terminating in an outlet 5 under which any suitable juice receiving receptacle is adapted to be positioned. Within the bowl 3 I provide lugs 6 adapted to hold a combined reamer and strainer member 7 against relative rotation with respect to the bowl. The member 7 comprises a base member provided with openings 8 of such size that they are adapted to prevent the passage of seed, thus enabling them to act as straining openings for the juice. Recesses 22 are provided in the base of member 7 for interfitting with lugs 6. Integral with the base member are a plurality of upstanding members 9 formed with tapered sides 10, terminating in a fillet 11. The fillet presents a rounded edge adapted to wipe the juice cells against the rind and express the juice therefrom, while permitting the pulp or membrane-like material which forms the casing for the juice cells, to be retained against the rind, when the fruit is rotated by the rotating means, hereinafter more fully described. The strainer and reamer may be made of glazed, ceramic material and may be readily lifted from the bowl for cleaning and rinsing.

Pivoted adjacent the bowl upon a suitable lug 12, by means of a pin 13 is an arm 14, the end of which is provided with a bearing member 15 in which a shaft 16 is mounted for movement along the axis of shaft 16 and for rotation in the bearing 15. Secured to shaft 16 in any suitable manner is an inverted cuplike member 17 provided with a plurality of rind impaling members 18. Loosely mounted upon shaft 16 is a pressure exerting member 19, adapted to bear against shoulder 20, formed upon the inverted cap 17. The shaft 16 is adapted to be rotated by a suitable handle 21.

In operation, the arm 14 is swung to the dotted line position shown in Figure 1, carrying with it the inverted cup and associated operating parts. One half of the citrus fruit to be subjected to a juice extracting operation is placed, with the cut side downwardly, over the reamer. The arm is then swung, permitting the inverted cup to engage the outside of the fruit. Pressure is exerted by means of member 19 upon the inverted cup-like member, moving it downwardly in bearing 15 and impaling the rind at a plurality of points with spikes 18. Exerting a slight pressure with one hand upon member 19, the operating handle 21 is rotated with the other hand. The speed with which the juice may be expressed is governed by the speed of rotation and by the pressure exerted. The rounded fillets 11 wipe by the inside of the fruit and local pressure is exerted by the reaming members against the pulp and rind which is, in turn, supported by the inverted cup member 17. The juice is rapidly and cleanly expressed. It is free from rind oil, seeds, and pulp.

It will be observed that I have accomplished the objects of my invention. I have provided a simple device which may be easily broken down for cleaning, which will express the juice free of seeds, pulp and rind oil.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a fruit juice extractor, a fruit juice receiving member, a standard for supporting said member, a fruit juice outlet for said member, a juice extracting reamer, lugs in said juice receiving member for positioning said reamer therein, an arm positioned adjacent said juice receiving member, said arm carrying a bearing and adapted to be swung into position over said reamer, a shaft slidable in said bearing, a fruit receiving member secured to one end of said shaft for rotation therewith, an operating handle secured to the opposite end of said shaft and a bearing member loosely positioned upon said shaft, adapted to transmit manual pressure upon said fruit receiving member.

2. A fruit juice extractor as in claim 1 wherein said reamer is provided with a strainer.

JOSEPH M. MAJEWSKI, Jr.